United States Patent
Ooba et al.

(10) Patent No.: US 8,062,139 B2
(45) Date of Patent: Nov. 22, 2011

(54) FIXED CONSTANT-VELOCITY UNIVERSAL JOINT

(75) Inventors: Hirokazu Ooba, Iwata (JP); Keisuke Sone, Iwata (JP)

(73) Assignee: NTN Corporation, Osaka (JP)

( * ) Notice: Subject to any disclaimer, the term of this patent is extended or adjusted under 35 U.S.C. 154(b) by 452 days.

(21) Appl. No.: 12/225,487

(22) PCT Filed: Mar. 23, 2007

(86) PCT No.: PCT/JP2007/056045
§ 371 (c)(1),
(2), (4) Date: Sep. 23, 2008

(87) PCT Pub. No.: WO2007/114080
PCT Pub. Date: Oct. 11, 2007

(65) Prior Publication Data
US 2009/0264208 A1    Oct. 22, 2009

(30) Foreign Application Priority Data
Mar. 31, 2006 (JP) ................................. 2006-099962

(51) Int. Cl.
*F16D 3/224* (2011.01)
(52) U.S. Cl. ........................................ 464/145; 464/906
(58) Field of Classification Search .................. 464/145, 464/906
See application file for complete search history.

(56) References Cited

U.S. PATENT DOCUMENTS

| | | | |
|---|---|---|---|
| 4,090,375 A | 5/1978 | Takahashi et al. | |
| 5,509,857 A * | 4/1996 | Flaugher | 464/145 |
| 5,542,885 A | 8/1996 | Krude et al. | |
| 5,549,514 A | 8/1996 | Welschof | |
| 6,398,657 B2 | 6/2002 | Krude et al. | |
| 2001/0006910 A1 | 7/2001 | Krude et al. | |
| 2001/0046901 A1 | 11/2001 | Meyer et al. | |

(Continued)

FOREIGN PATENT DOCUMENTS

| | | | | |
|---|---|---|---|---|
| DE | 2 039 965 | * | 2/1972 | .................... 464/145 |

(Continued)

OTHER PUBLICATIONS

International Search Report mailed May 29, 2007 for International Application No. PCT/JP2007/056045.

(Continued)

*Primary Examiner* — Gregory Binda
(74) *Attorney, Agent, or Firm* — Wenderoth, Lind & Ponack, L.L.P.

(57) ABSTRACT

A fixed constant velocity universal joint with eight balls achieves improvement in cage strength by increasing a smallest outer diameter of a cage and improvement in joint strength at a high operating angle by ensuring required inner spherical area and spherical surface angle in an outer member regardless of the smallest outer diameter of the cage. In the fixed constant velocity joint of the present invention, among eight frontal sections adjacent to an inner spherical surface on an outer member opening side, present between adjacent ball grooves formed on the inner spherical surface, and forming a smallest inner diameter of an outer member opening, any one or any two mutually opposing frontal sections are retracted from the smallest inner diameter in an outward radius direction by a distance required to allow insertion of the cage through the one or two frontal sections (cylindrical surfaces or planar surfaces) in a state in which a cage axial line is perpendicular to an outer member axial line.

4 Claims, 6 Drawing Sheets

U.S. PATENT DOCUMENTS

2003/0171152 A1  9/2003  Jacob et al.
2005/0153782 A1* 7/2005  Jacob et al. .................. 464/145

FOREIGN PATENT DOCUMENTS

| | | |
|---|---|---|
| JP | 51-130748 | 11/1976 |
| JP | 54-93850 | 7/1979 |
| JP | 5-45253 | 6/1993 |
| JP | 6-502906 | 3/1994 |
| JP | 6-193645 | 7/1994 |
| JP | 9-177814 | 7/1997 |
| JP | 2001-208092 | 8/2001 |
| JP | 2001-323945 | 11/2001 |
| JP | 2001-349333 | 12/2001 |
| JP | 2002-250360 | 9/2002 |
| WO | 02/02959 | 1/2002 |

OTHER PUBLICATIONS

European Search Report issued Feb. 4, 2011 in corresponding European Application No. 07 73 9486.

* cited by examiner

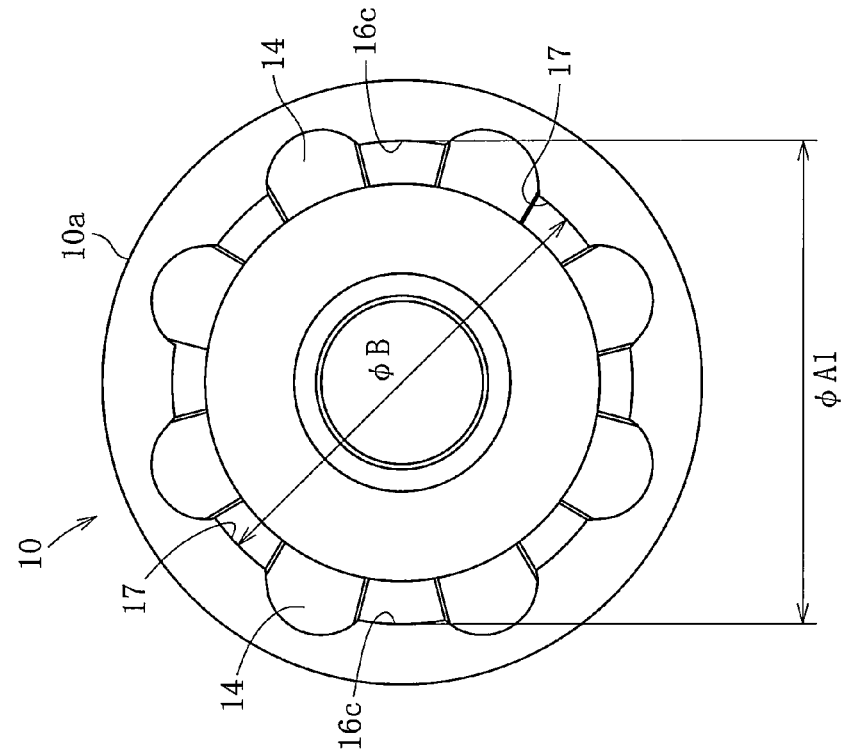
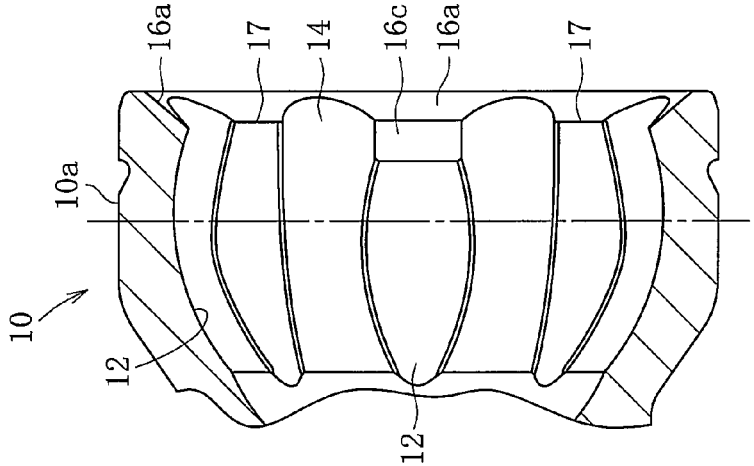

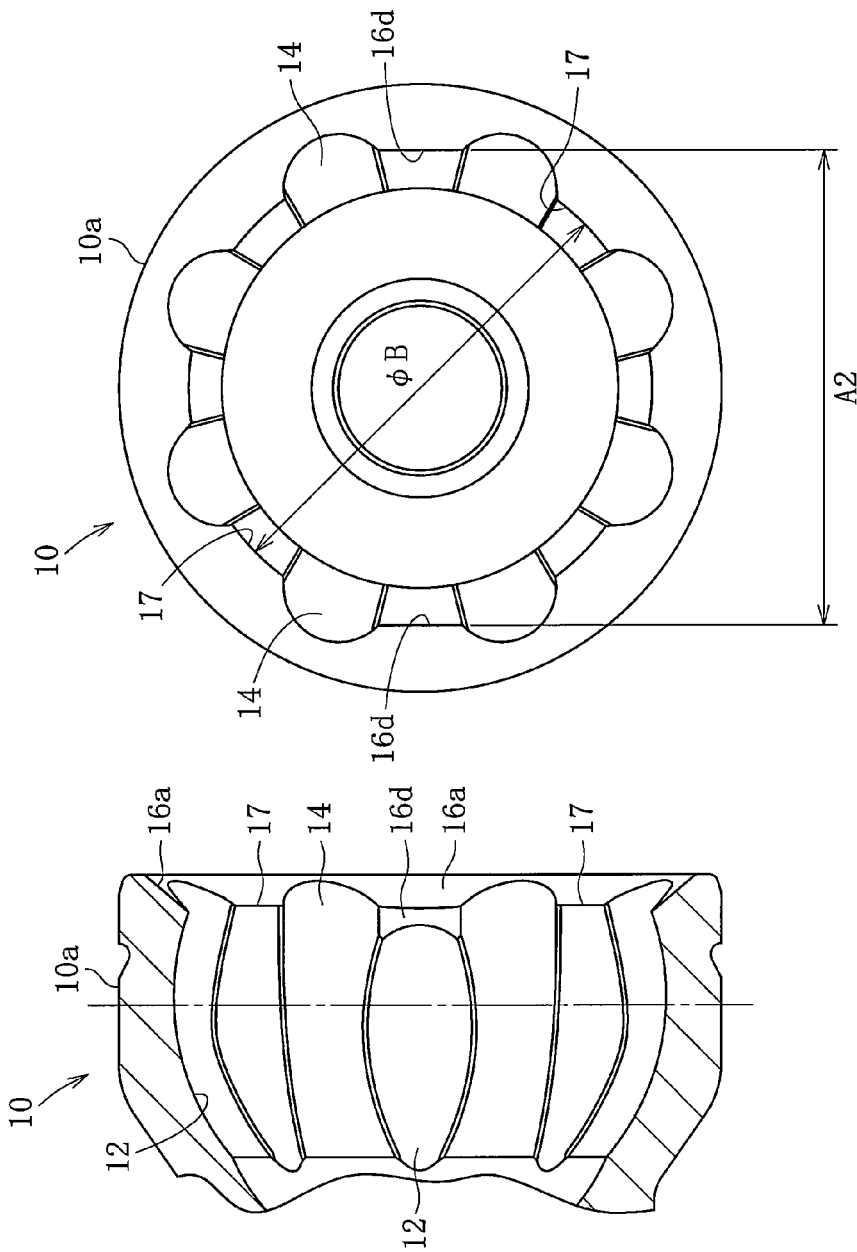

FIXED CONSTANT-VELOCITY UNIVERSAL JOINT

BACKGROUND OF THE INVENTION

I. Technical Field

The present invention relates to a fixed constant velocity universal joint disposed between two axes on a driving side and a driven side in a power transmission system of automobiles and various industrial machineries, the fixed constant velocity universal joint allowing only angular displacement. The present invention achieves improvements in torsional fatigue strength and quasi-static torsional strength at a high operating angle.

II. Description of the Related Art

A fixed constant velocity universal joint is generally used in an axle connecting section of a drive shaft and a shaft bend connecting section of a steering shaft in an automobile. A Rzeppa-type constant velocity universal joint and an undercut-free type (referred to, hereinafter, as a UJ-type) constant velocity universal joint are conventionally known as the fixed constant velocity universal joint described above. On the other hand, when a wheel base is extended in view of improvements in ride comfort and collision safety of the automobile, the vehicle rotation radius increases. To reduce the vehicle rotation radius, a steering angle of front wheels is required to be increased by the angle of the fixed constant velocity universal joint being increased.

The Rzeppa-type constant velocity universal joint that is a fixed constant velocity universal joint includes an outer member, an inner member, balls, and a cage. A plurality of curved ball grooves are formed evenly spaced on an inner spherical surface of the outer member. The same number of curved ball grooves are formed on an outer spherical surface of the inner member. A center of curvature of the outer member ball grooves and a center of curvature of the inner member ball grooves are offset from a center O of the joint by equal distances to the right and left. A ball is incorporated between an outer member ball groove and an inner member ball groove, and the cage is incorporated between the outer member and the inner member. The cage has spherical surfaces on the inside and outside, the spherical surfaces being in contact with and guided by the inner spherical surface of the outer member and the outer spherical surface of the inner member. The cage also has windows that house the balls and are evenly spaced in a circumferential direction.

The UJ-type fixed constant velocity universal joint has been invented to achieve a higher operating angle than the Rzeppa-type constant velocity universal joint. As shown in FIG. 9, in a ball center trajectory (C3 center) of a ball groove 114 on an outer member 110, among arcs of a meridional line of the above-described Rzeppa-type, a portion closer to an opening side of the outer member 110 than a cross-section perpendicular to an axis passing through a ball groove center (C3) of the outer member 110 is a straight line parallel to a joint axis C L. C2 is an inner spherical surface center of the outer member 10.

FIGS. 5(A) and (B) show the outer member 110 for a constant velocity universal joint having eight balls. 112 indicates an inner spherical surface. 114 indicates a ball groove. 116a indicates a chamfer. 116b indicates a cylindrical section. $\alpha_0$ indicates a spherical surface angle. $D_0$ indicates an axial direction distance from the center of the outer member 110 to a starting position of the cylindrical section 16b. When the cage 120 in FIG. 6 is incorporated into the outer member 110, as shown in FIG. 7 and FIG. 8, the cage 120 is inserted from an axial direction of the outer member 110 in a state in which an axial line of the cage 120 is tilted by 90 degrees to an outer member axial line (refer to FIG. 12 in Japanese Patent Laid-open Publication No. Heisei 6-193645, FIG. 5 in Japanese Utility Model Laid-open Publication No. Heisei 5-45253, and FIG. 5 in Japanese Patent Laid-open Publication No. Heisei 9-177814). As another method, the axial lines of the cage 120 and the outer member 110 can be on a same axis, and the cage 120 can be inserted from the axial direction of the outer member 110 (refer to FIG. 5 in Japanese Utility Model Laid-open Publication No. Showa 54-93850).

In the former insertion method, more specifically, an inner member (not shown) is tilted by 90 degrees to the cage 120. After the inner member is inserted into the cage 120 in this state, both components are relatively rotated by 90 degrees in a direction in which an axial center of the cage 120 and an axial center of the inner member are aligned, and the inner member is incorporated into the cage 120. Next, the inner member with the cage 120 and the outer member 110 are relatively tilted to 90 degrees as shown in FIG. 7 and FIG. 8. After the inner member with the cage 120 is inserted into the outer member 110, both components are tilted by 90 degrees in a direction in which axial centers of the outer member 110 and the inner member are aligned, and the inner member with the cage is incorporated into the outer member 110.

SUMMARY OF THE INVENTION

When the cage 20 is relatively tilted by 90 degrees and inserted into the outer member 10 of the constant velocity universal joint using the balls as a torque transmitting component as described above, as shown in FIG. 8, a dimensional relationship is set such that cylindrical sections 16b serving as frontal sections forming a smallest inner diameter of an outer member opening and an outer border adjacent surface 22 of a ball holding window 21 forming a smallest outer diameter of the cage 20 do not interfere with each other. Conventionally, interference with the outer border adjacent surface 22 that is the smallest outer diameter of the cage 20 is prevented by the frontal cylindrical sections 16b of the outer member 10 being uniformly retracted in an outward radial direction. When the frontal cylindrical sections 16b of the outer member 10 are retracted, the spherical surface angle $\alpha_0$ of the outer member 10 decreases and outer member strength deteriorates. However, in a conventional joint, the frontal cylindrical sections 16b of the outer member 10 are uniformly retracted in view of an insertion operation of the cage 20.

In light of the above-described issues, the present invention provides a fixed constant velocity universal joint including a torque transmitting ball that can, by retracting only one or two frontal sections on an outer member opening side, ensure required inner spherical surface area and spherical angle in other outer member frontal sections regardless of a smallest outer diameter of a cage, thereby achieving an improvement in joint strength at a high operating angle.

On the other hand, optimal design of a joint interior is being advanced in a constant velocity universal joint including eight torque transmitting balls, compared to a constant velocity universal joint including six balls. Therefore, an effect on outer member strength accompanying the retraction of only one or opposing opening sections on the outer member opening side is not as significant as in the joint with six balls because of a quantitative factor and the like, the quantitative factor being one-eighths or two-eighths.

A first aspect of the invention is a fixed constant velocity universal joint including an outer member on which ball grooves extending in an axial direction are formed on an inner spherical surface, an inner member on which ball grooves extending in an axial direction are formed on an outer spherical surface, a torque transmission ball incorporated between each ball groove on the outer member and each ball groove on the inner member that form a pair, and a cage that is interposed between the inner spherical surface of the outer member and the outer spherical surface of the inner member and holds the torque transmission ball in an axial direction. In the fixed constant velocity universal joint, among frontal sections being adjacent to the inner spherical surface on an outer member opening side, presented between adjacent ball grooves formed on the inner spherical surface, and forming a smallest inner diameter of an outer member opening, any one or any two mutually opposing frontal sections are retracted from the smallest inner diameter in an outward radius direction by a distance required to allow insertion of the cage through the one or two frontal sections in a state in which a cage axial line is perpendicular to an outer member axial line.

As a result of one or two frontal sections of the outer member being retracted, spherical surface angles in the retracted frontal sections are sacrificed to some degree. However, a required spherical surface angle can be maintained in the remaining frontal sections. Torsional fatigue strength and quasi-static torsional strength at a high operating angle can be improved in the overall joint.

A second aspect of the invention according to the first aspect of the invention, in which the one or two frontal sections retracted in the outward radial direction are cylindrical surfaces of which a center is the outer member axial line.

A third aspect of the invention according to the first aspect of the invention, in which the one or two frontal sections retracted in the outward radial direction are planar surfaces parallel to the outer member axial line and perpendicular to an outer member radius.

When the frontal section is cut into a planar surface, compared to when the frontal section is cut into a cylindrical surface, an opening side area of an outer member inner circumferential surface can be extended outward at a frontal section center to which the spherical surface angle significantly contributes. Therefore, the planar surface cut is more advantageous than the cylindrical surface cut when the retracted frontal sections have the same inner diameter.

A fourth aspect of the invention according to the third aspect of the invention, in which, among adjacent surfaces adjacent to an outer edge of a ball holding window on a cage outer diameter surface, one or two adjacent surfaces passing through the one or two frontal sections retracted in the outward radial direction during cage insertion are planar surfaces parallel to a cage axial line and perpendicular to a cage radius.

When the retracted frontal section of the outer member is a planar surface, the corresponding outer edge adjacent surface of the ball holding window is not required to be a cylindrical surface. When the outer edge adjacent surface is a cylindrical surface, an outer member spherical surface angle is excessively sacrificed. When the retracted frontal section of the outer member is a planar surface and the outer edge adjacent surface of the ball holding window is a planar surface of a maximum outer diameter allowing the frontal section planar surface to pass, the outer member spherical surface angle is required to be increased. When the planar surface of the outer edge adjacent surface of the ball holding window is increased, a cage thickness decreases and becomes low in strength. Therefore, a distribution ratio between the planar surface of the retracted frontal section of the outer member and the planar surface of the outer edge adjacent surface of the ball holding window can be changed depending on usage.

As described above, among frontal sections forming a smallest inner diameter of an outer member opening in the fixed constant velocity universal joint with a number of balls of the present invention, any one or any two mutually opposing frontal sections are retracted in an outward radial direction by a predetermined distance. A smallest outer diameter is then increased by the distance, thereby achieving improvement in cage strength. In addition, required inner spherical surface area and spherical surface angle can be achieved in other outer member frontal sections regardless of the smallest outer diameter of the cage. As a result of an angle $\alpha_0$ formed by contact force between a cage outer spherical surface and an outer member inner spherical surface increasing, and component force in the axial direction increasing, contact force decreases. Strength and durability improve. Moreover, play is reduced in the spherical surface section, thereby improving efficiency.

BRIEF DESCRIPTION OF THE DRAWINGS

FIG. 1(A) is a vertical cross-sectional view of an outer member of a fixed constant velocity universal joint with eight balls according to a first embodiment of the present invention; (B) is an end view of the outer member;

FIG. 2(A) is a vertical cross-sectional view of an outer member of a fixed constant velocity universal joint with eight balls according to a second embodiment of the present invention; (B) is an end view of the outer member;

DETAILED DESCRIPTION OF THE INVENTION

Figure 3A:
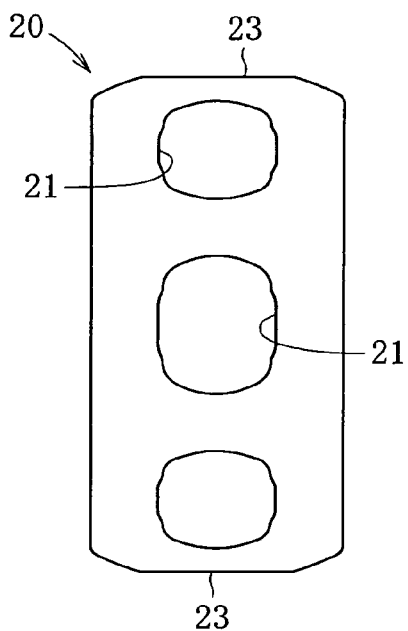
FIG. 3 shows a cage used in a fixed constant velocity universal joint with eight balls according to a third embodiment of the present invention; (A) is a side view of the cage; (B) is a front view of the cage.

Embodiments of the present invention will be described hereafter with reference to the accompanying drawings.

FIGS. 1 to 4 are examples of embodiments of the present invention. FIGS. 1(A) and (B) show the present invention according to a first embodiment in which an outer member frontal section is cut. Specifically, an outer member 10 includes a mouth section 10a and a subsequent stem section (not shown). The mouth section 10a is bowl-shaped and has an opening at one end. An inner circumferential surface of the mouth section 10a is an inner spherical surface 12. Eight ball grooves 14 extending in an axial direction are formed on the inner spherical surface 12, evenly spaced and in a circumferential direction.

Chamfers 16a are consecutively formed on a mouth section 10a opening side edge section of the outer member 10 in a circumferential direction. The chamfers 16a are in contact with a shaft when the shaft connected to an inner member is at a maximum operating angle. Arc-shaped edge lines 17 of the chamfers 16a and an opening side of the inner spherical surface 12 of the mouth section 10a form a smallest inner diameter øB of the mouth section 10a. Among the arc-shaped edge lines 17, a pair of edge lines 17 opposing each other in a diameter direction of the outer member 10 are cut on cylindrical surfaces 16c of which a center is an outer member axial line. The inner spherical surface 12 continues on an inner side of the cylindrical surfaces 16c of the outer member 10. Therefore, a border between the cylindrical surfaces 16c and the inner spherical surface 12 is almost a straight line when viewed from the side. A distance øA1 between the cylindrical surfaces 16c forms a largest inner diameter on the opening side of the mouth section 10a excluding the ball grooves 14 (øB<øA1). In FIG. 1, the inner member, a cage, and balls are omitted. Conventional inner member, cage and balls can be used.

Figure 5B:
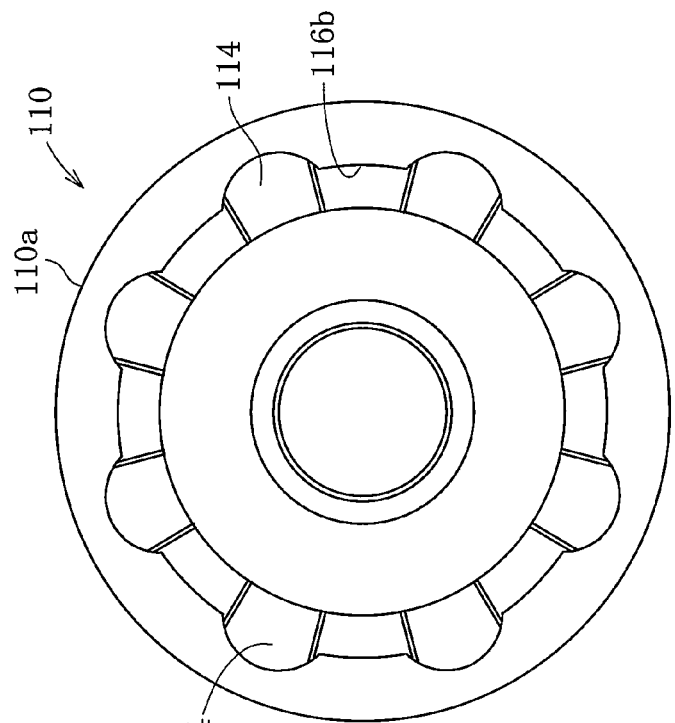
FIG. 5(B) is an end view of the outer member.
Figure 5A:
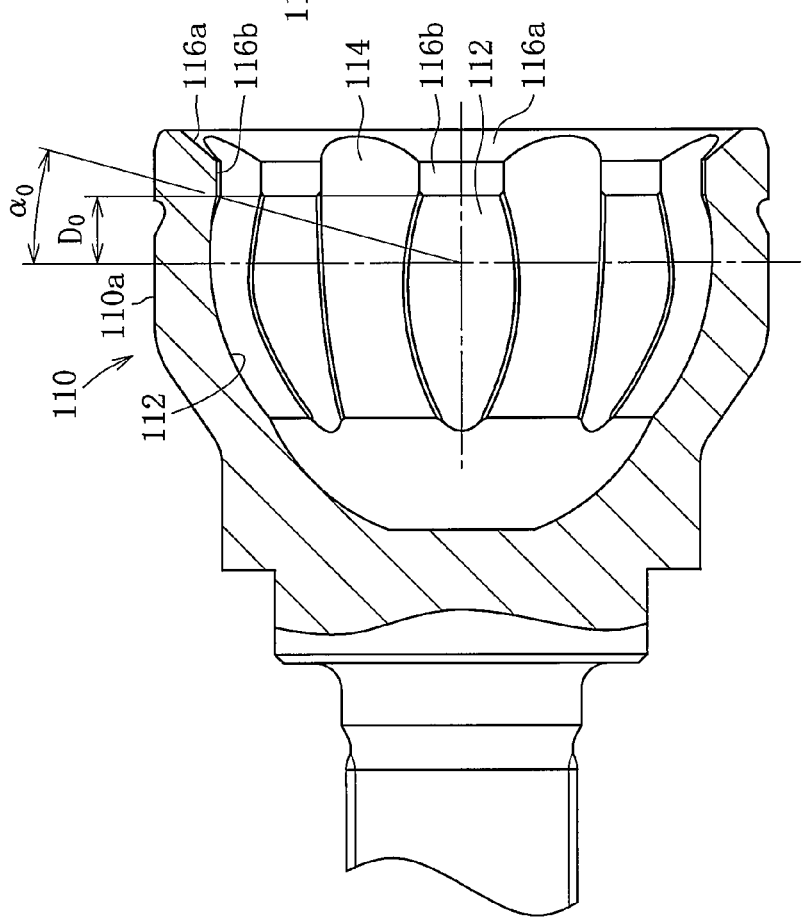
FIG. 5(A) is a vertical cross-sectional view of an outer member of a conventional fixed constant velocity universal joint with eight balls.
Figure 6A:
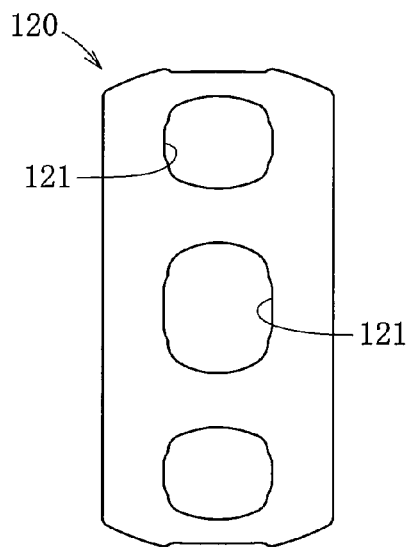
FIG. 6(A) is a side view of a conventional cage; (B) is a front view of the conventional cage.
Figure 6B:
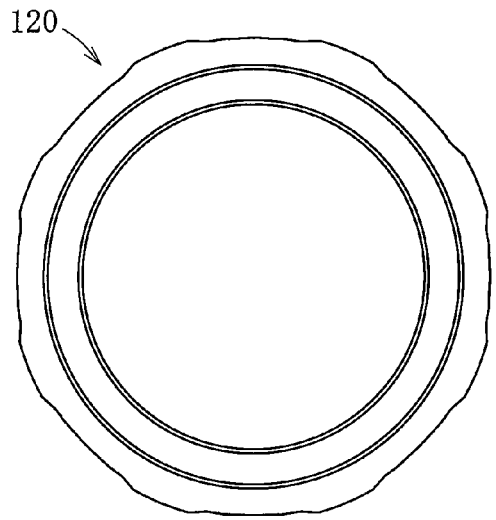
Figure 7:
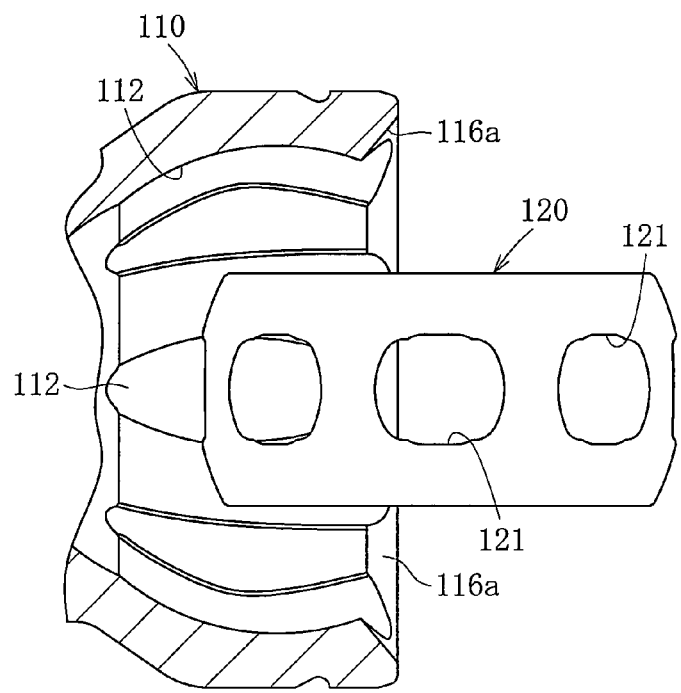
FIG. 7 is a vertical cross-sectional view of a conventional outer member when a cage is tilted by 90 degrees to the outer member and inserted.
Figure 8:
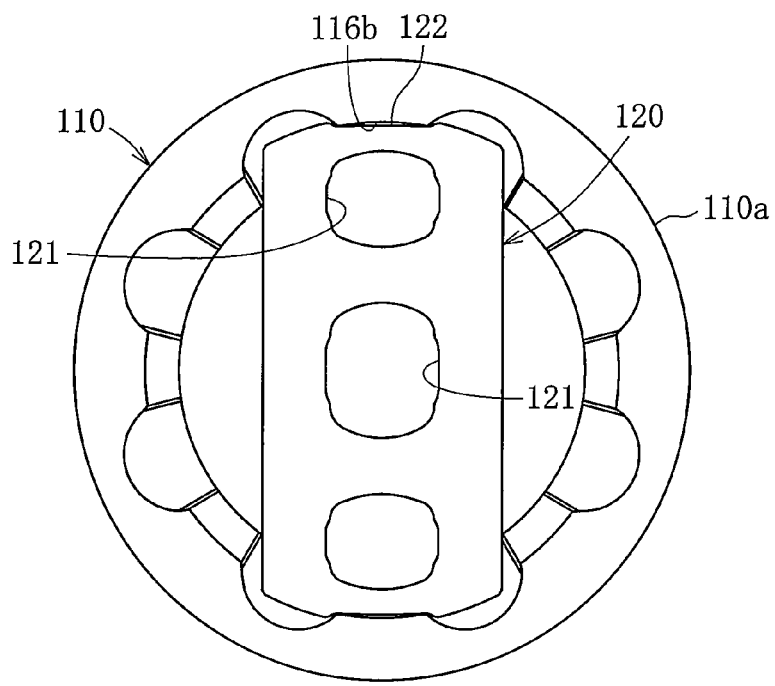
FIG. 8 is a front view of the conventional outer member when the cage is tilted by 90 degrees to the outer member and inserted.
Figure 9:
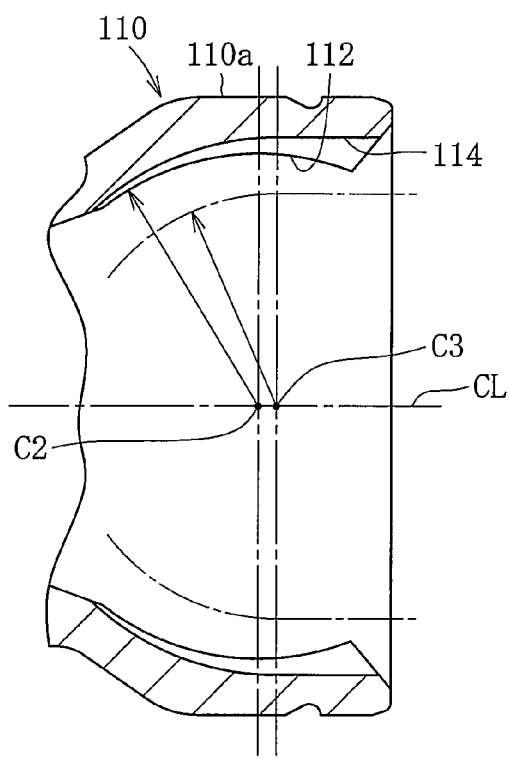
FIG. 9 is a vertical cross-sectional view of the conventional outer member.

When an inner diameter of the cylindrical surfaces 16c is increased and an area is increased as described above, a relationship is such that an opening side area of the inner spherical surface 12 is taken by the increased amount. When a cage 20 is inserted into the outer member 10, the inner diameter of the cylindrical surfaces 16c is required to be increased to prevent interference with a cage outer diameter. However, when the inner diameter of the cylindrical surfaces 16c is uniformly increased, reduction in the area of the outer member inner spherical surface 12 cannot be prevented, as described above. Moreover, the spherical surface angle $\alpha_0$ in FIG. 5(A) also becomes smaller. This indicates that an area of the cage 20 held by the outer member 10 to stop detachment decreases and surface pressure increases. As a result, strength and durability of the fixed constant velocity joint are compromised.

Therefore, to ensure a predetermined outer member inner spherical surface 12 area and spherical surface angle, the inner diameter of the outer member cylindrical sections 16b is required to be less than a constant diameter. To reduce the outer member cylindrical section 16b inner diameter, the smallest diameter of the cage 20 is required to be reduced. The smallest diameter of the cage 20 can be reduced by a section of a cage outer diameter surface that continues to a window outer border in an axial direction being eliminated. However, deterioration in strength of the cage 20 cannot be avoided.

In this way, the outer member frontal section inner diameter and the cage outer diameter are in a trade-off relationship regarding joint strength. However, the present invention can, by retracting only one or two frontal sections under a condition in which the fixed constant velocity universal joint has a number of balls, ensure the required inner spherical surface area and the spherical angle in outer member frontal sections that are not retracted, regardless of the smallest outer diameter of the cage. As a result, an improvement in joint strength at a high operating angle can be achieved.

FIGS. 2(A) and (B) show a second embodiment of the present invention that is an example in which the frontal sections of the outer member are configured by planar surfaced 16d. Other aspects are similar to FIG. 1. In other words, the planar surfaces 16d are formed on the outer member frontal section in place of the cylindrical surfaces 16c in FIG. 1. A distance A2 between planar surfaces 16d forms the largest inner diameter on the opening side of the mouth section 10a, excluding the ball grooves 14 (øB<A2).

Other than forming any two mutually opposing frontal sections into cylindrical surfaces or planar surfaces in FIG. 1 or FIG. 2, the cage can be incorporated by forming any one of the frontal sections into a large cylindrical surface or planar surface. As a result of the four frontal sections being formed as a cylinder or a planar surface, balance can be achieved.

Figure 3B:
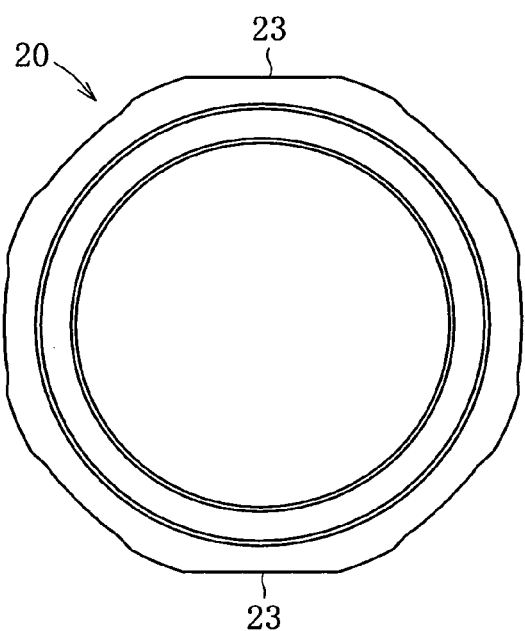
Figure 4:
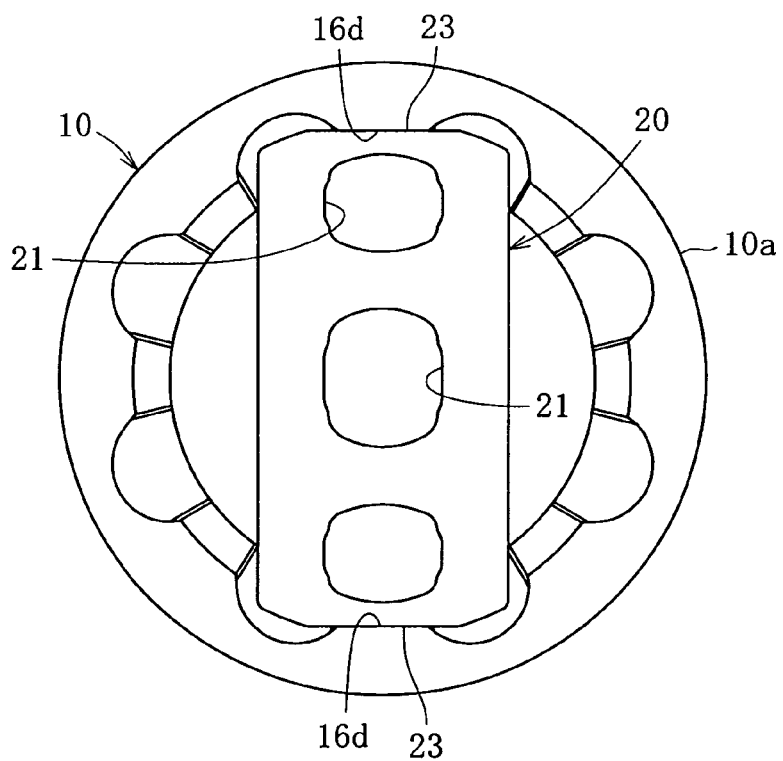
FIG. 4 is a front view of an outer member when the outer member and the cage according to the third embodiment are tilted by 90 degrees and inserted.

FIG. 3 shows a cage used in a fixed constant velocity universal joint with eight balls according to a third embodiment of the present invention. Among adjacent surfaces of ball holding windows 21 of the cage 20, a pair of adjacent surfaces positioned in a diameter direction of the cage 20 form planar surfaces 23 that are parallel with an axial line of the cage and perpendicular to a cage radius. The cage 20 is used in combination with the outer member 10 in FIG. 2. When the cage 20 is inserted into the outer member 10 in a state in which the cage 20 is tilted by 90 degrees to the outer member 10, the planar surfaces 23 that are retracted adjacent surfaces of the cage 20 outer diameter pass by the planar surface 16d of the outer member 10 in parallel. The cage 20 is inserted into the outer member 10 in a state in which both side shoulder sections of the cage 20 are partially embedded into the ball grooves 14. As a result, a greater spherical surface angle $\alpha 0$ of the spherical surface 12 of the retracted opening surfaces 16c and 16d can be ensured. When the cylindrical surface 16c or the planar surface 16d of the outer member 10 is a single surface, the planar surface 23 of the cage 20 is also a single surface. Taking into consideration workability when an inner member with a cage is inserted into the outer member 10, in other words, to facilitate positioning of the cylindrical surface 16c or the planar surface 16d of the outer member 10 and the planar surface 23 of the cage 20, a mark can be made at easily visible areas of the outer member 10 and the cage 20 through engraving or painting.

The fixed constant velocity universal joint of the present invention is not limited to the embodiments described above. Various modifications can be made within a scope of the spirit of the present invention.

The invention claimed is:

1. A fixed constant velocity universal joint comprising:
an outer member having an inner spherical surface, eight ball grooves extending in an axial direction of said outer member and being disposed on said inner spherical surface, and a plurality of frontal sections adjacent to said inner spherical surface on an outer member opening side, each frontal section of said plurality of frontal sections being disposed between adjacent ball grooves on said outer member;
an inner member having an outer spherical surface, and eight ball grooves extending in an axial direction of said inner member and being disposed on said outer spherical surface;
torque transmission balls incorporated between said eight ball grooves on said outer member and said eight ball grooves on said inner member so as to form eight pairs of ball grooves; and
a cage interposed between said inner spherical surface of said outer member and said outer spherical surface of said inner member and holding said torque transmission balls in an axial direction of said cage,
wherein:
said frontal sections form a smallest inner diameter of an outer member opening, and two mutually opposing frontal sections are retracted from the smallest inner diameter in an outward radius direction by a predetermined distance so as to enable insertion of said cage through said two frontal sections in a state in which a cage axial line is perpendicular to an outer member axial line.

2. The fixed constant velocity universal joint according to claim 1, wherein:

said two frontal sections retracted in the outward radius direction are cylindrical surfaces of which a center is the outer member axial line.

3. The fixed constant velocity universal joint according to claim 1, wherein:
said two frontal sections retracted in the outward radius direction are planar surfaces parallel to the outer member axial line and perpendicular to an outer member radius.

4. The fixed constant velocity universal joint according to claim 3, wherein:

said cage includes a ball holding window having an outer edge on a cage outer diameter surface, and among adjacent surfaces adjacent to said outer edge of said ball holding window on said cage outer diameter surface, at least one adjacent surface passing through said two frontal sections retracted in the outward radius direction during cage insertion are planar surfaces parallel to a cage axial line and perpendicular to a cage radius.

* * * * *